US012687894B2

(12) United States Patent
Hsieh

(10) Patent No.: US 12,687,894 B2
(45) Date of Patent: Jul. 21, 2026

(54) ELECTRONIC DEVICE

(71) Applicant: Getac Technology Corporation, New Taipei City (TW)

(72) Inventor: Cheng Yu Hsieh, Taipei City (TW)

(73) Assignee: Getac Technology Corporation, New Taipei City (TW)

( * ) Notice: Subject to any disclaimer, the term of this patent is extended or adjusted under 35 U.S.C. 154(b) by 97 days.

(21) Appl. No.: 18/939,749

(22) Filed: Nov. 7, 2024

(65) Prior Publication Data

US 2025/0224775 A1      Jul. 10, 2025

(30) Foreign Application Priority Data

Jan. 8, 2024      (CN) .......................... 202410023088.2

(51) Int. Cl.
*G06F 1/16*          (2006.01)
*H01Q 1/22*          (2006.01)
(52) U.S. Cl.
CPC .......... *G06F 1/1658* (2013.01); *G06F 1/1681* (2013.01); *H01Q 1/2266* (2013.01)
(58) Field of Classification Search
CPC .... G06F 1/1658; G06F 1/1681; H01Q 1/2266
See application file for complete search history.

(56) References Cited

U.S. PATENT DOCUMENTS 9,019,713 B2 *   4/2015   Wu ........................ G06F 1/1681
                                                              361/755
9,086,848 B2 *   7/2015   Kinoshita ............... G06F 1/162

9,223,342 B2 *   12/2015   Chang .................... H01Q 19/10
10,852,764 B2 *  12/2020   Senatori .................... G06F 1/16
11,296,399 B2 *   4/2022   Hung .................... H01Q 21/30
11,575,193 B2 *   2/2023   Wang ........................ H01Q 1/48
2011/0115735 A1 *  5/2011   Lev ........................ H01Q 1/2266
                                                              345/173
2014/0004795 A1 *  1/2014   Kawashimo ......... H04B 7/0604
                                                              455/41.1
2014/0009881 A1 *  1/2014   Kinoshita ............. G06F 1/1637
                                                              361/679.28

(Continued)

FOREIGN PATENT DOCUMENTS

CN          104656776 A      5/2015
JP          2014093751 A      5/2014

(Continued)

*Primary Examiner* — Michael Pervan
(74) *Attorney, Agent, or Firm* — Cooper Legal Group, LLC

(57)          ABSTRACT

An electronic device includes a first housing for disposing a display screen, and a second housing for disposing a system circuit board, wherein a first side of the second housing is directly connected to a first side of the first housing through a rotating pivot; wherein an antenna circuit board is disposed on a second side of the first housing relative to the rotating pivot, the antenna circuit board has a radiating portion and a first grounding portion, and the radiating portion includes an antenna segment; wherein a second side of the second housing relative to the rotating pivot has a conductor layer, and the conductor layer has a coupling portion and a second grounding portion; when the electronic device is in the tablet mode, the conductor layer overlaps the antenna circuit board. In this way, the impedance mismatch and frequency offset of the antenna in tablet mode are improved.

10 Claims, 6 Drawing Sheets

(56)          References Cited

U.S. PATENT DOCUMENTS

| | | | | |
|---|---|---|---|---|
| 2015/0133188 | A1* | 5/2015 | Chang .................. | H01Q 1/2266 |
| | | | | 455/556.1 |
| 2018/0341288 | A1* | 11/2018 | Senatori ................ | G06F 1/1618 |
| 2021/0242567 | A1* | 8/2021 | Wang ..................... | H01Q 1/245 |
| 2021/0280958 | A1* | 9/2021 | Hung ..................... | H01Q 21/28 |

FOREIGN PATENT DOCUMENTS

| | | | | | |
|---|---|---|---|---|---|
| WO | WO-2010005423 | A1 * | 1/2010 | ........... | G06F 1/1616 |
| WO | WO-2014002538 | A1 * | 1/2014 | ............. | G06F 1/162 |

* cited by examiner

ELECTRONIC DEVICE

CROSS-REFERENCE TO RELATED APPLICATION

This application claims the benefit of priority to the China Patent Application No. 202410023088.2, filed on Jan. 8, 2024. The entirety of China Patent Application No. 202410023088.2 is hereby incorporated by reference herein and made a part of this specification.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE INVENTION

The invention relates to an electronic device, and more particularly to an electronic device having a tablet mode.

BACKGROUND OF THE INVENTION

Laptops have many functions with variety uses, especially a tablet mode where the display screen is flipped over to use the laptop as a tablet. Due to the limited internal space of the laptop, the antenna in the laptop is usually placed near the display screen. When the laptop is in a laptop mode, the signal radiated by the antenna will not be interfered by the system circuit board. However, when the laptop is in the tablet mode, the antenna and the system circuit board may completely or partially overlap to interfere the antenna radiating, resulting in antenna impedance mismatch and frequency offset. How to avoid affecting impedance matching and frequency of the antenna when the laptop is in the tablet mode is critical issue to be solved in this technical field.

The information disclosed in this section is only for enhancement understanding of the background of the invention and therefore it may contain information that does not form the prior art that is already known to a person of ordinary skill in the art. Furthermore, the information disclosed in this section does not mean that one or more problems to be solved by one or more embodiments of the invention were acknowledged by a person of ordinary skill in the art.

SUMMARY OF THE INVENTION

The invention provides an electronic device that can adjust the impedance matching and resonant frequency of an antenna circuit board.

Other advantages and objects of the invention may be further illustrated by the technical features broadly embodied and described as follows.

In order to achieve one or a portion of or all of the objects or other objects, an embodiment of the invention provides an electronic device that has a laptop mode and a tablet mode, and includes a first housing for disposing a display screen, and a second housing for disposing a system circuit board, wherein a first side of the second housing is directly connected to a first side of the first housing through a rotating pivot; wherein an antenna circuit board is disposed on a second side of the first housing relative to the rotating pivot, the antenna circuit board has a radiating portion and a first grounding portion, and the radiating portion includes an antenna segment; wherein a second side of the second housing relative to the rotating pivot has a conductor layer, and the conductor layer has a coupling portion and a second grounding portion; wherein when the electronic device is in the tablet mode, the conductor layer overlaps the antenna circuit board.

In one embodiment of the invention, when the electronic device is in the tablet mode, the coupling portion overlaps the radiating portion.

In one embodiment of the invention, the coupling portion has a conductor segment, the conductor segment and the antenna segment do not overlap each other and are arranged parallel to each other, and a length of the conductor segment is at most a quarter of an antenna wavelength.

In one embodiment of the invention, the coupling portion has a conductor segment, the conductor segment and the antenna segment do not overlap each other and are arranged parallel to each other, and a width of the conductor segment is at most one ninth of an antenna wavelength.

In one embodiment of the invention, the coupling portion has a conductor segment, the conductor segment and the antenna segment do not overlap each other and are arranged parallel to each other, and a distance between the conductor segment and the antenna segment is at most one sixth of an antenna wavelength.

In one embodiment of the invention, when the electronic device is in the tablet mode, the second grounding portion overlaps the first grounding portion.

In one embodiment of the invention, the second grounding portion has an area larger than or equal to the first grounding portion.

In one embodiment of the invention, when the electronic device is in the tablet mode, the antenna circuit board partially overlaps the system circuit board.

In one embodiment of the invention, when the electronic device is in the tablet mode, the conductor layer partially overlaps the system circuit board.

In one embodiment of the invention, when the electronic device is in the tablet mode, the conductor layer is located between the antenna circuit board and the system circuit board.

The present invention adopts the conductor layer and adjusts the size of the coupling portion and the grounding portion in the conductor layer, so it can solve the problems of impedance mismatch and resonant frequency offset of the antenna circuit board when the electronic device is in the tablet mode.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. The drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Accordingly, the drawings and descriptions will be regarded as illustrative in nature and not as restrictive.

Figure 1:
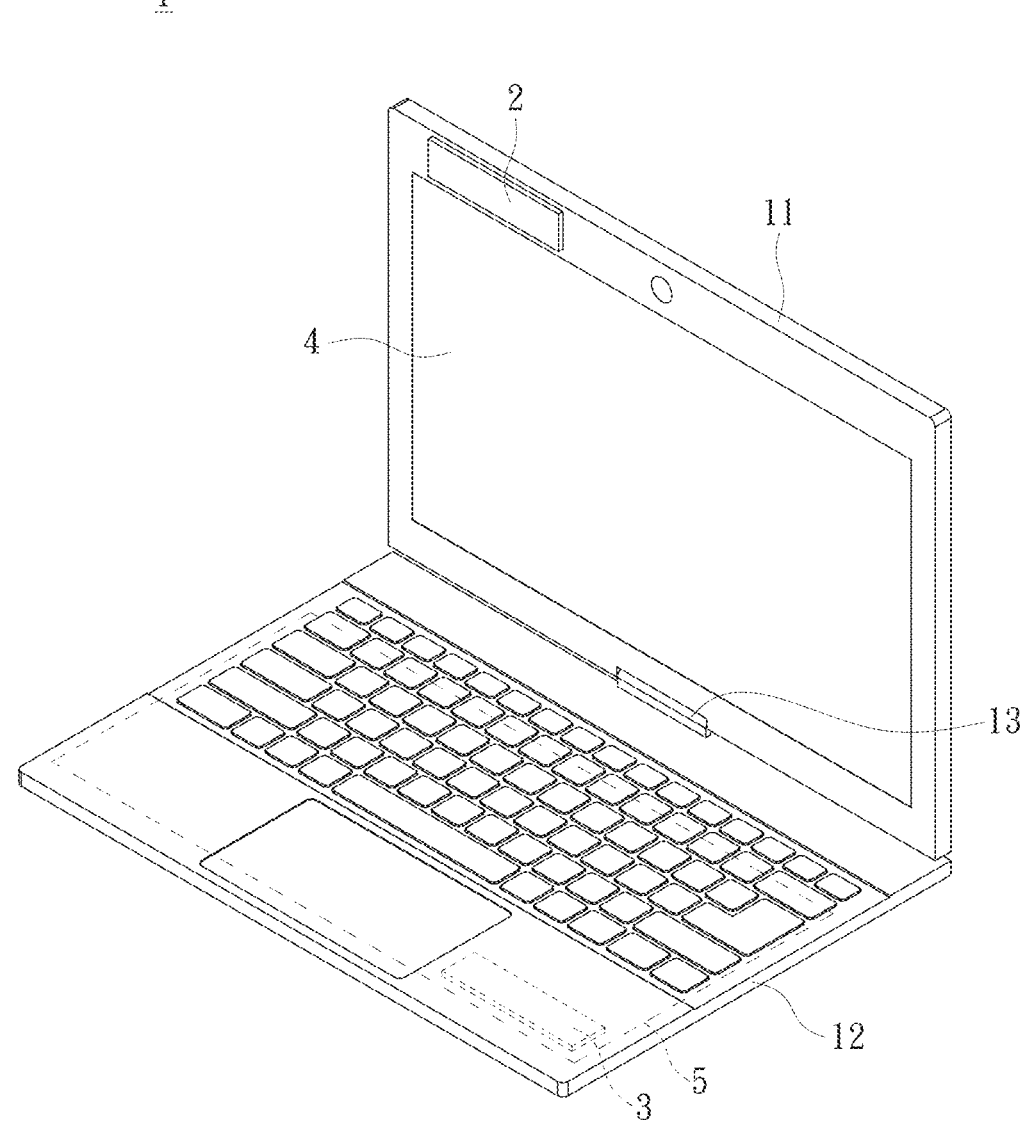
FIG. 1 is a schematic diagram of the electronic device in the laptop mode according to an embodiment of the present invention.
Figure 2:
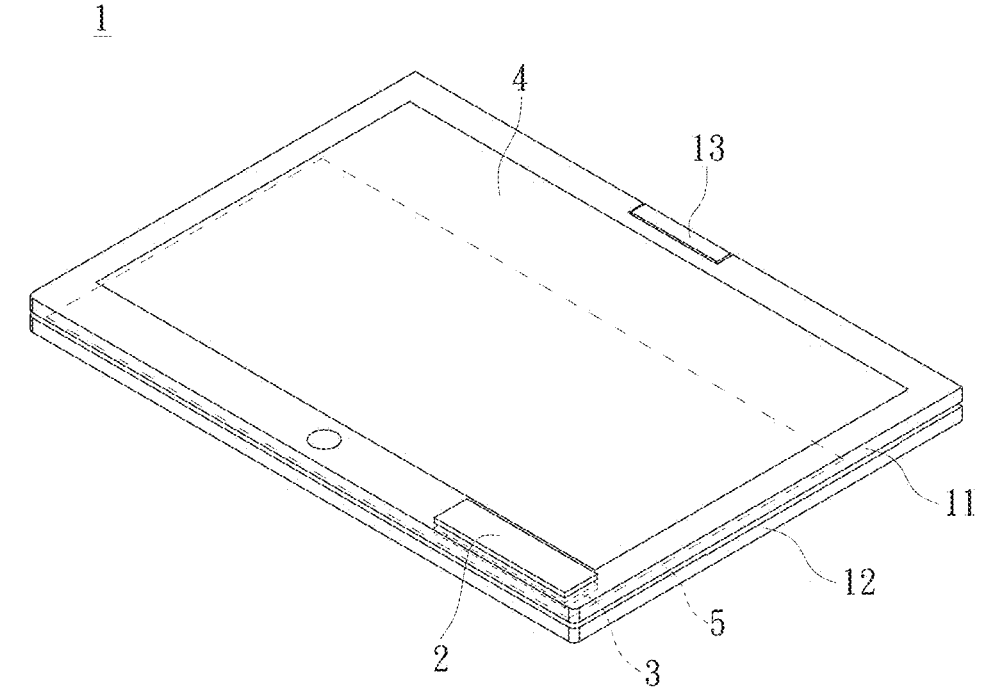
FIG. 2 is a schematic diagram of the electronic device in the tablet mode according to an embodiment of the present invention.

Reference is made to FIGS. 1 and 2, which are schematic diagrams of an electronic device in a laptop mode and a tablet mode respectively according to embodiments of the present invention. The electronic device 1 provided in the embodiment is a laptop, which has a laptop mode and a tablet mode. The first housing 11 is used to dispose the display screen 4, and the second housing 12 is used to dispose the system circuit board 5. A first side of the first housing 11 and a first side of the second housing 12 are directly connected to each other through the rotating pivot 13, so that the electronic device 1 can be converted between the laptop mode and the tablet mode. It should be noted that the rotating pivot 13 is a structure for converting the electronic device 1 between the laptop mode and the tablet mode, and can also be replaced by other conversion structures, and the present invention is not limited thereto.

In addition, an antenna circuit board 2 is disposed on a second side of the first housing 11 relative to the rotating pivot 13. The antenna circuit board 2 has a radiating portion 21 and a first grounding portion 22 as shown in FIGS. 3 and

4. The radiating portion 21 includes an antenna segment 211. The second housing 12 has a conductor layer 3 on its second side relative to the rotating pivot 13. The conductor layer 3 has a coupling portion 31 and a second grounding portion 32 as shown in FIGS. 3 and 4. It should be noted that in the embodiment, when the electronic device 1 is in the tablet mode, the conductor layer 3 overlaps the antenna circuit board 2. In other embodiments, when the electronic device 1 is in the tablet mode, the antenna circuit board 2 partially overlaps the system circuit board 5. In other embodiments, when the electronic device 1 is in the tablet mode, the conductor layer 3 partially overlaps the system circuit board 5. In other embodiments, when the electronic device 1 is in the tablet mode, the conductor layer 3 is located between the antenna circuit board 2 and the system circuit board 5.

Figure 3:
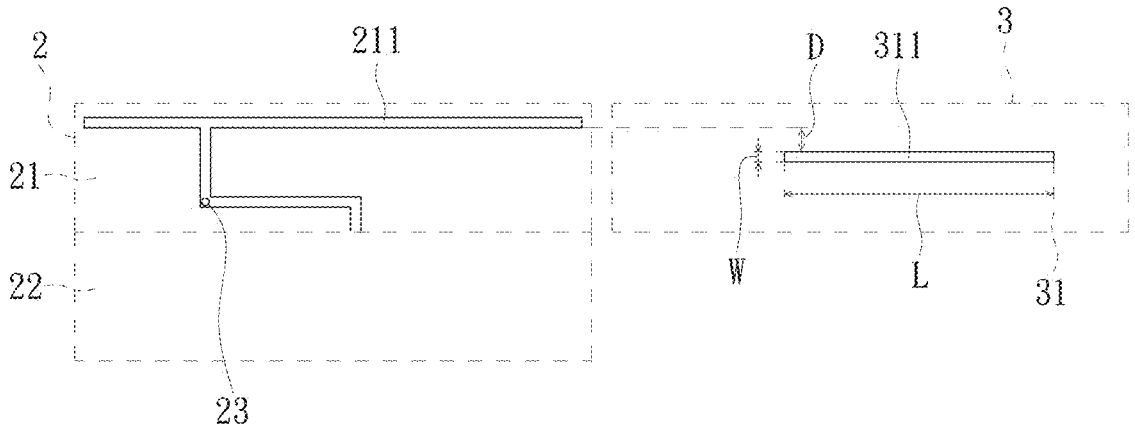
FIG. 3 is a schematic diagram comparing the antenna circuit board and the conductor layer provided by an embodiment of the present invention.
Figure 4:
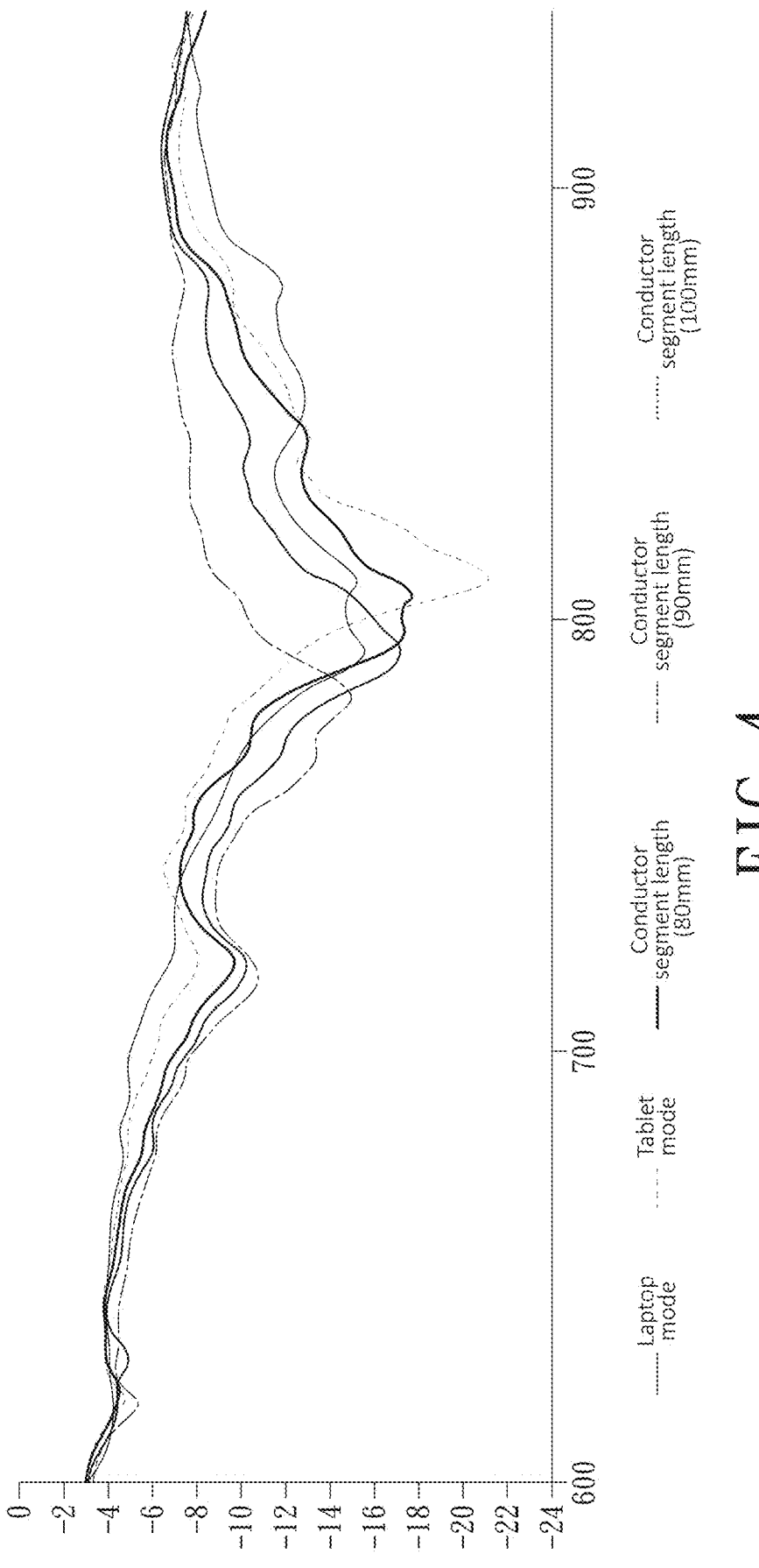
FIG. 4 is a schematic diagram of the length of the conductor segment versus the resonant frequency of the antenna provided by an embodiment of the present invention.

Reference is made to FIG. 3, which is a schematic diagram comparing the antenna circuit board and the conductor layer according to an embodiment of the present invention. In order to clearly show the relative position and relationship between the conductor layer 3 and the antenna circuit board 2, FIG. 3 is shown in a non-overlapping manner that the conductor layer 3 is on the right and the antenna circuit board 2 is on the left. In the embodiment, when the electronic device 1 is in the tablet mode, the conductor layer 3 overlaps the antenna circuit board 2, where the antenna circuit board 2 has a radiating portion 21, a first grounding portion 22 and a feeding point 23, the conductor layer 3 has a coupling portion 31, and the radiating portion 21 overlaps the coupling portion 31. It is particularly noted that the coupling portion 31 has a conductor segment 311, and the conductor segment 311 and the antenna segment 211 do not overlap each other and are arranged in parallel to each other.

In an embodiment, a length of the conductor segment 311 is at most a quarter of the antenna wavelength. In an example, the conductor segment 311 has a length (L) of 90 mm, a width (W) of 10 mm, and a distance (D) of 15 mm from the antenna segment 211 as a reference. The conductor segment 311 has different lengths (L) of 80 mm, 90 mm, and 100 mm respectively to couple with antenna segment 211. As shown in FIG. 4, when the length (L) of the conductor segment 311 increases, the offset of the resonant frequency of the antenna of the antenna circuit board 2 increases, so the length (L) of the conductor segment 311 must be limited to at most a quarter of the antenna wavelength.

Figure 5:
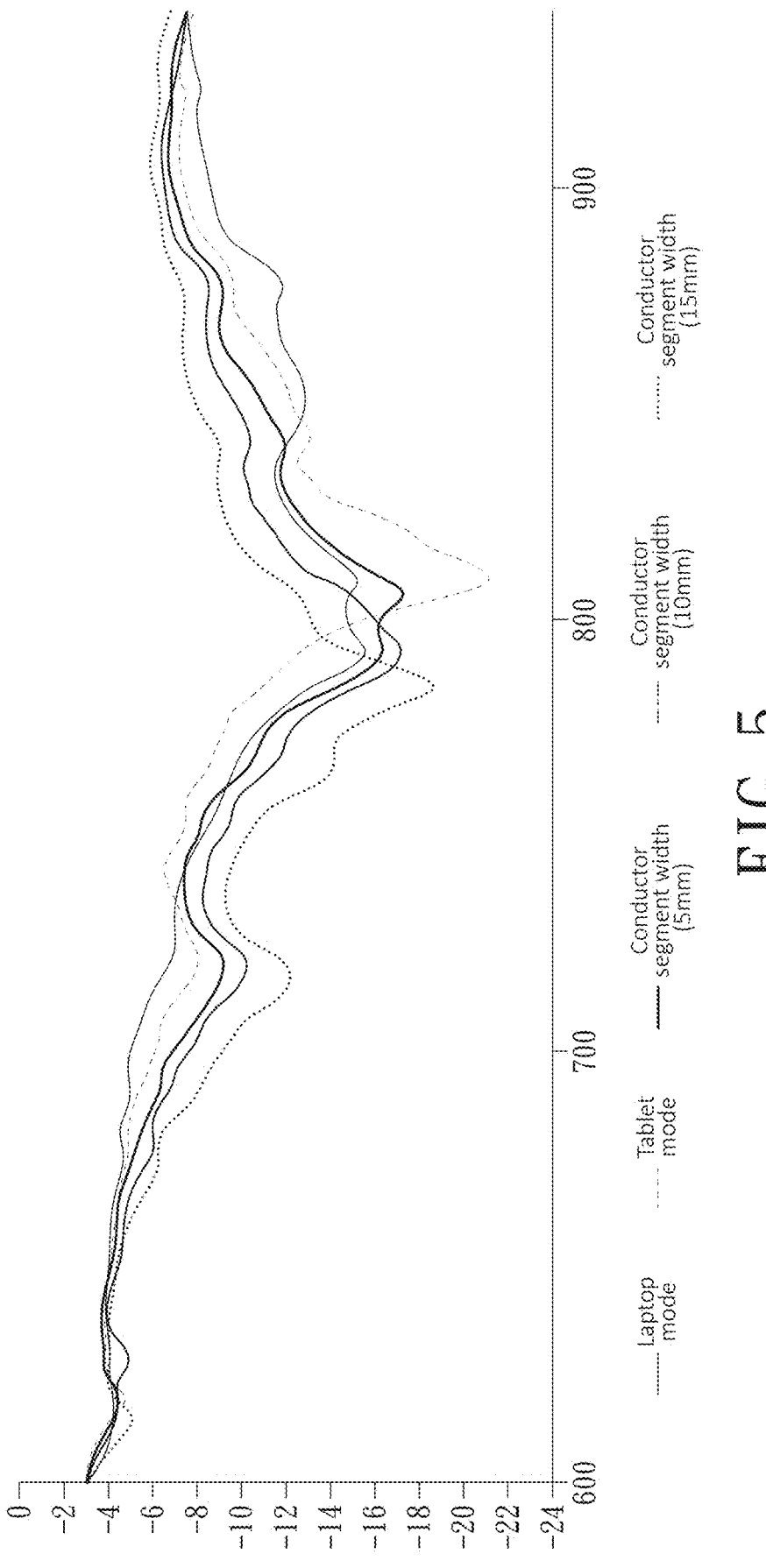
FIG. 5 is a schematic diagram of the conductor segment width versus the resonant frequency of the antenna provided by an embodiment of the present invention.

In an embodiment, a width of the conductor segment 311 is at most one ninth of the antenna wavelength. In an example, the conductor segment 311 has a length (L) of 90 mm, a width (W) of 10 mm, and a distance (D) of 15 mm from the antenna segment 211 as a reference. The conductor segment 311 has different widths (W) of 5 mm, 10 mm, and 15 mm respectively to couple with antenna segment 211. As shown in FIG. 5, when the width (W) of the conductor segment 311 increases, the offset of the resonant frequency of the antenna of the antenna circuit board 2 increases, so the width (W) of the conductor segment 311 must be limited to at most nine one tenth of the antenna wavelength.

Figure 6:
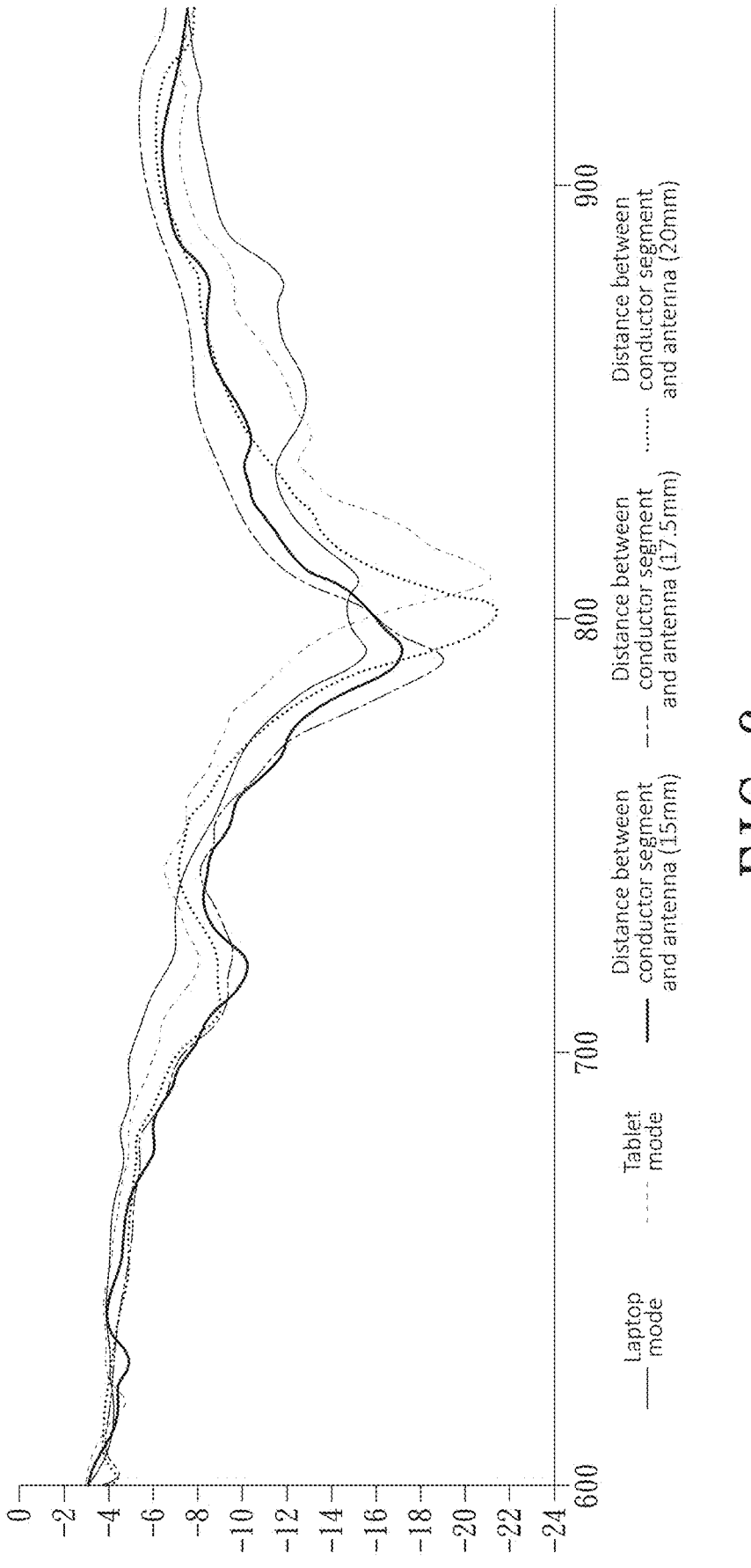
FIG. 6 is a schematic diagram of the distance between the conductor segment and the antenna segment versus the resonant frequency of the antenna provided by an embodiment of the present invention.

In an embodiment, a distance between the conductor segment 311 and the antenna segment 211 is at most one sixth of the antenna wavelength. In an example, the conductor segment 311 has a length (L) of 90 mm, a width (W) of 10 mm, and a distance (D) of 15 mm from the antenna segment 211 as a reference. The conductor segment 311 are respectively based on the distances (D) between the conductor segment 311 and the antenna segment 211 of 15 mm, 17.5 mm, 20 mm to couple with antenna segment 211. As shown in FIG. 6, when the distance (D) between the conductor segment 311 and the antenna segment 211 increases, the offset of the resonant frequency of the antenna of the antenna circuit board 2 increases. Therefore, the distance (D) between the conductor segment 311 and the antenna segment 211 must be limited to at most one sixth of the antenna wavelength.

Figure 7:
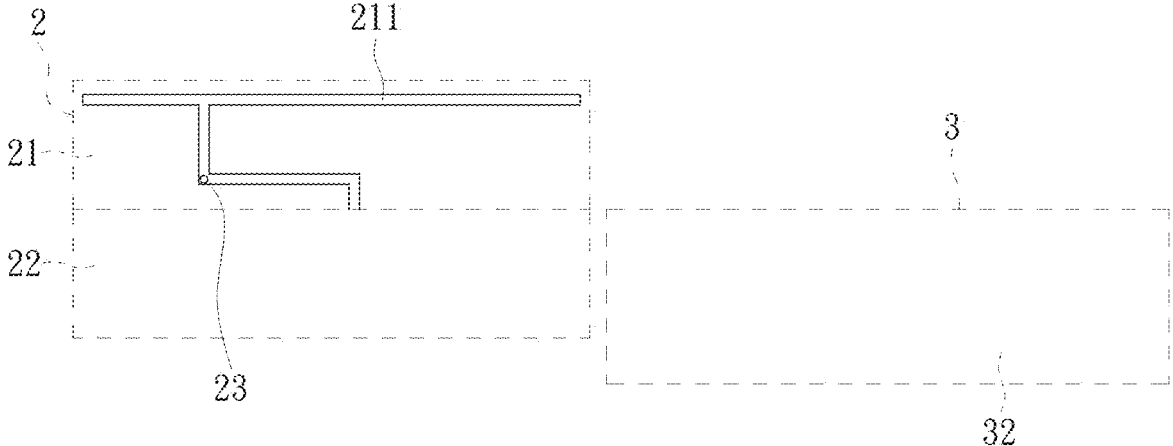
FIG. 7 is a schematic diagram comparing the antenna circuit board and the conductor layer according to another embodiment of the present invention.

Reference is made to FIG. 7, which is a schematic diagram comparing the antenna circuit board and the conductor layer according to another embodiment of the present invention. In order to clearly show the relative position and relationship between the conductor layer 3 and the antenna circuit board 2, FIG. 7 is shown in a non-overlapping manner that the conductor layer 3 is on the right and the antenna circuit board 2 is on the left. In the embodiment, when the electronic device 1 is in the tablet mode, the conductor layer 3 overlaps the antenna circuit board 2, where the antenna circuit board 2 has a radiating portion 21, a first grounding portion 22 and a feeding point 23, the conductor layer 3 has a second grounding portion 32, and the second grounding portion 32 overlaps the first grounding portion 22. It is particularly noted that the second grounding portion 32 has an area larger than or equal to the first grounding portion 22. Preferably, the second grounding portion 32 has an area larger than the first grounding portion 22, so that the effect of impedance matching of the antenna circuit board 2 is better and return loss is less.

In addition, in an embodiment, when the electronic device 1 is in tablet mode, the conductor layer 3 overlaps the antenna circuit board 2, where the antenna circuit board 2 has a radiating portion 21, a first grounding portion 22 and a feeding point 23, the conductor layer 3 has a coupling portion 31 and the second grounding portion 32, the coupling portion 31 overlaps the radiating portion 21, and the second grounding portion 32 overlap the first grounding portion 22. Moreover, the coupling portion 31 has a conductor segment 311, the conductor segment 311 and the antenna segment 211 do not overlap each other and are arranged in parallel to each other, and the second grounding portion 32 has an area larger than or equal to the first grounding portion 22. The conductor layers 3 shown in FIGS. 3 and 7 can be combined to have the coupling portion 31 and the second grounding portion 32.

In summary, the electronic device provided by the present invention adopts a conductor layer and adjusts the size of the coupling portion and the grounding portion in the conductor layer, so it can solve the problems of impedance mismatch and resonant frequency offset of the antenna circuit board when the electronic device is in the tablet mode.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first housing, the second housing, the first side, the second side, the first grounding portion and the second grounding portion are only used for distinguishing various elements and do not limit the number of the elements.

What is claimed is:

1. An electronic device having a laptop mode and a tablet mode, and comprising:
   a first housing for disposing a display screen; and
   a second housing for disposing a system circuit board;
   wherein a first side of the second housing is directly connected to a first side of the first housing through a rotating pivot;
   wherein an antenna circuit board is disposed on a second side of the first housing relative to the rotating pivot, the antenna circuit board has a radiating portion and a first grounding portion, and the radiating portion comprises an antenna segment;
   wherein a second side of the second housing relative to the rotating pivot has a conductor layer, and the conductor layer has a coupling portion and a second grounding portion;
   wherein when the electronic device is in the tablet mode, the conductor layer overlaps the antenna circuit board.

2. The electronic device according to claim 1, wherein when the electronic device is in the tablet mode, the coupling portion overlaps the radiating portion.

3. The electronic device according to claim 2, wherein the coupling portion has a conductor segment, the conductor segment and the antenna segment do not overlap each other and are arranged parallel to each other, and a length of the conductor segment is at most a quarter of an antenna wavelength.

4. The electronic device according to claim 2, wherein the coupling portion has a conductor segment, the conductor segment and the antenna segment do not overlap each other and are arranged parallel to each other, and a width of the conductor segment is at most one ninth of an antenna wavelength.

5. The electronic device according to claim 2, wherein the coupling portion has a conductor segment, the conductor segment and the antenna segment do not overlap each other and are arranged parallel to each other, and a distance between the conductor segment and the antenna segment is at most one sixth of an antenna wavelength.

6. The electronic device according to claim 1, wherein when the electronic device is in the tablet mode, the second grounding portion overlaps the first grounding portion.

7. The electronic device according to claim 6, wherein the second grounding portion has an area larger than or equal to an area of the first grounding portion.

8. The electronic device according to claim 1, wherein when the electronic device is in the tablet mode, the antenna circuit board partially overlaps the system circuit board.

9. The electronic device according to claim 1, wherein when the electronic device is in the tablet mode, the conductor layer partially overlaps the system circuit board.

10. The electronic device according to claim 1, wherein when the electronic device is in the tablet mode, the conductor layer is located between the antenna circuit board and the system circuit board.

\* \* \* \* \*